Jan. 4, 1927. 1,612,799
M. BRAEN
VEHICLE TRANSMISSION
Filed March 3, 1926   2 Sheets-Sheet 2
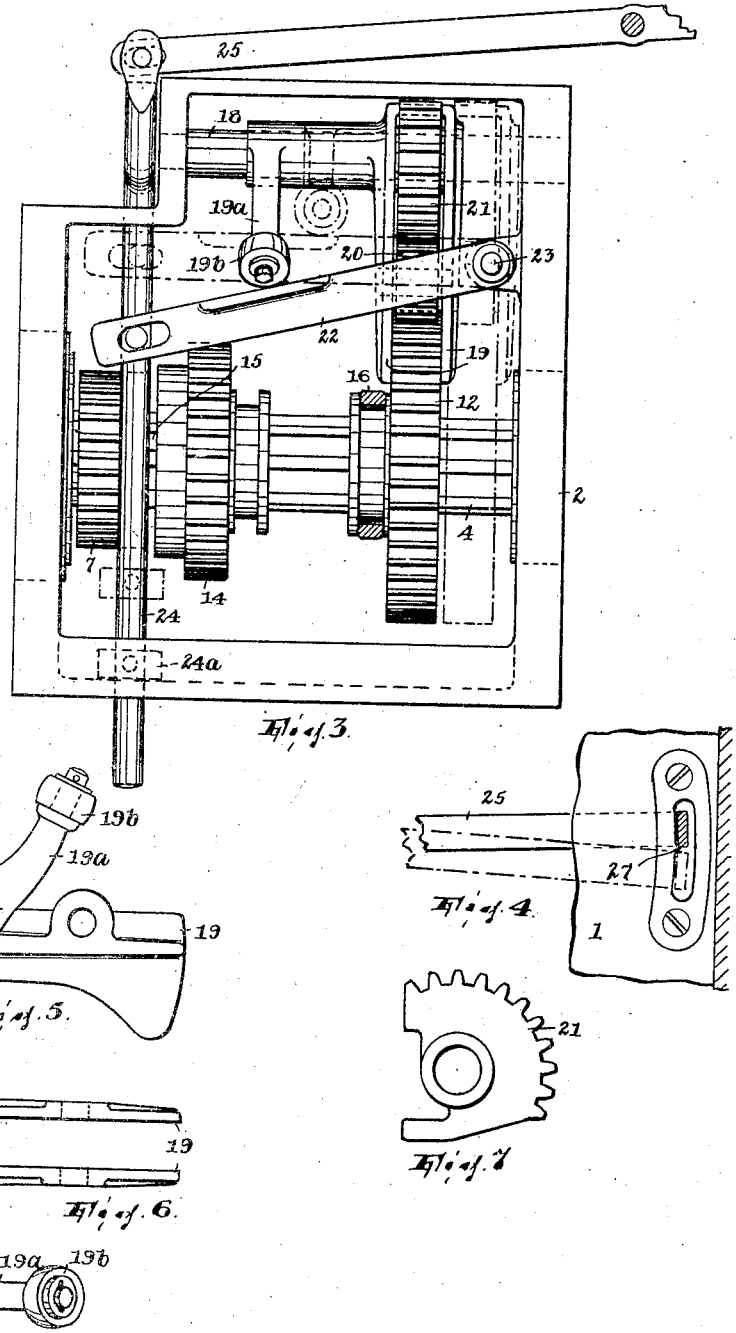
INVENTOR,
Martin Braen,
BY
ATTORNEY.
WITNESS Patented Jan. 4, 1927.

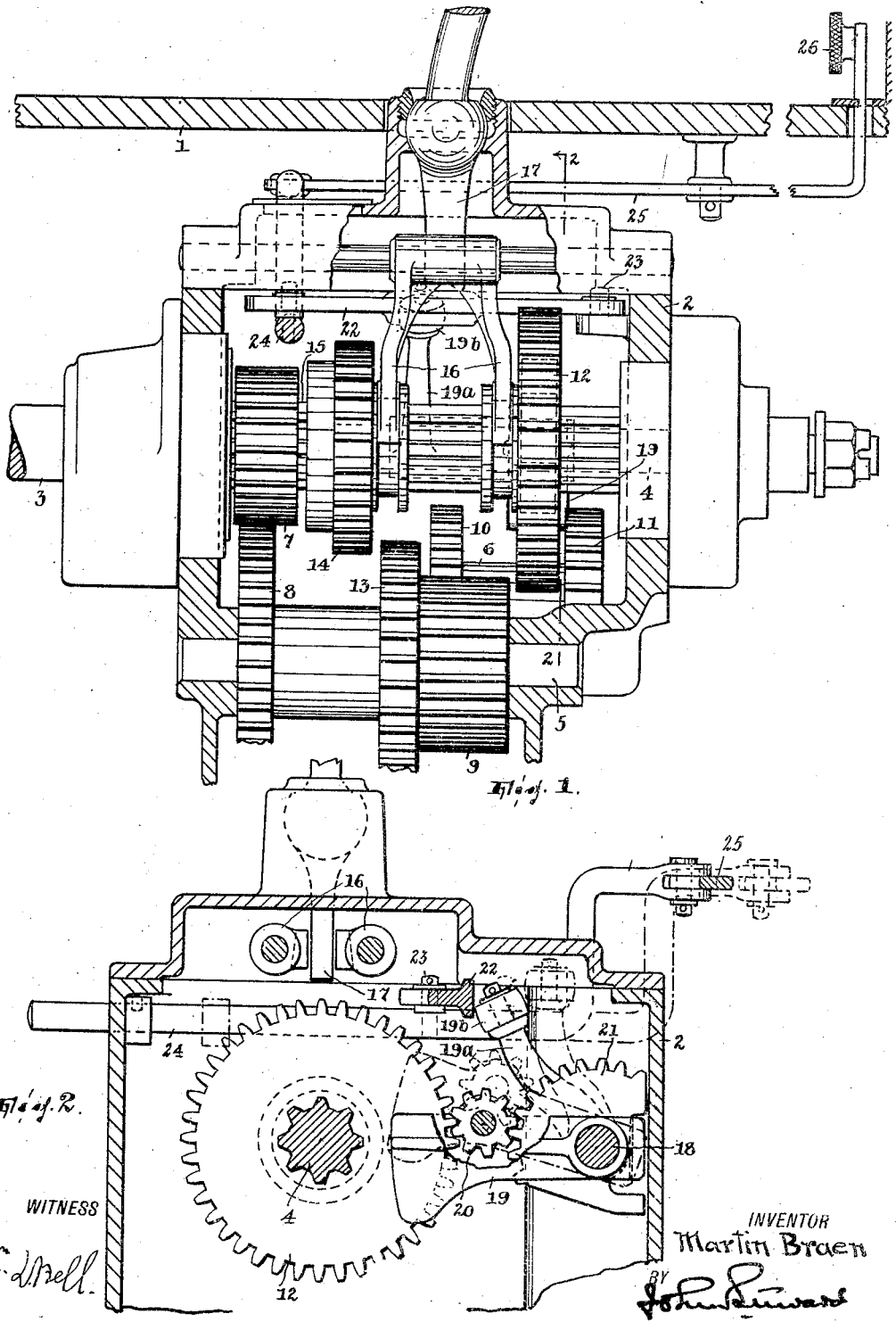

1,612,799

UNITED STATES PATENT OFFICE.

MARTIN BRAEN, OF HAWTHORNE, NEW JERSEY.

VEHICLE TRANSMISSION.

Application filed March 3, 1926. Serial No. 91,941.

This invention relates to mechanism for preventing inadvertent backing of an automobile, as when the propeller shaft is disconnected from the engine when the vehicle is on a backwardly sloping grade. One object of the invention is to provide a detent for automatically preventing such inadvertent backing which shall be reliable and efficient and silent in its operation. Another object is to provide for rendering said device inoperative when the vehicle is backed either under its own power or by man-power.

In the accompanying drawings,

Fig. 1 is a side elevation, partly in section, of the transmission mechanism of an automobile, with the invention applied thereto;

Fig. 2 is a section on line 2—2, Fig. 1, looking to the left;

Fig. 3 is a plan, partly in section;

Fig. 4 shows a detail; and

Figs. 5, 6 and 7 show details of the mentioned detent.

1 is the floor of an automobile body and 2 the casing, below the floor, for the gearing and other parts of the transmission mechanism; 3 is the motor shaft, 4 the propeller shaft, 5 the countershaft, and 6 the jack-shaft. What is known as the "standard" type of transmission is shown by way of example, that is to say: Shafts 3 and 5 are permanently connected through gears 7 and 8 thereon; and shafts 5 and 6 are permanently connected through gears 9 and 10 thereon, shaft 6 also carrying a gear 11. On shaft 4 is splined a gear 12 which may be shifted from the neutral position (shown, Fig. 1) forward into engagement with 9, whereby shaft 4 will be driven forward from shaft 3, or backward into engagement with gear 11, whereby shaft 4 will be driven reversely from shaft 3. The invention is not concerned with other forward speeds possible than by the intermeshing of 12 with 9, but for this purpose there is shown fixed on shaft 5 a gear 13 and on shaft 4 a splined gear 14 which may be shifted into engagement with 13, to produce second speed, or into engagement at 15 with gear 7 to produce third or highest speed. The sliding forks for shifting the gears 12 and 13 are indicated at 16, and at 17 is the gear-shift lever fulcrumed in the floor 1 to move forward and backward and also laterally, to engage one and clear the other of the forks, all as usual. We thus have a rotary driven system, including shaft 4, adapted to be rotated forwardly or backwardly by or be entirely disconnected from its driving means, including shaft 3. Said system, in the example illustrated, includes a member (12) which is splined on a rotary part thereof (shaft 4) so as to be shiftable lengthwise of the axis of rotation. I arrange on the fixed structure of the mechanism a detent to cooperate with a part of said system in a manner to prevent backward rotation thereof, and in the present example this detent cooperates with and partakes of the sliding movement of the splined rotary part mentioned. Thus:

A shaft 18 is fixed in the casing 2 parallel with the other shafts and laterally thereof (Fig. 2). On this shaft and free to slide lengthwise thereof is fulcrumed a forked lever 19 whose two arms or cheeks receive the gear 12, bearing with some friction against its side faces. Between the cheeks of this lever is journaled a pinion 20 which meshes with a toothed segment 21 concentric with 18 and, by bearing against the side of the casing as shown in Fig. 2, being held from rotation, so that it is in effect a part of the fixed structure. When gear 12 is turning in the anti-clockwise direction in Fig. 2, for forward driving of the vehicle, the detent thus formed is by the friction present between the gear and lever cheeks elevated, pinion 20 clearing the gear; but if gear 12 turns clockwise, as in inadvertent backing of the vehicle, the friction depresses the lever and pinion 20 engages the gear and in effect becomes a chock between 12 and 21 and holds the gear against rotation. I prefer this construction of detent in place of a plain pawl to engage the teeth of 12 since its locking or detent action is certain and obtains with less danger of stripping the gear or otherwise injuring the parts. Since the friction mentioned holds the detent out of operative position when the gear 12 is turning in the forward direction the operation is then noiseless and wear of the gear teeth is avoided.

The detent should be thrown out of action when the mechanism is to be intentionally backed, either by setting the transmission for that purpose or when backed by man-power. Hence the lever 19 has an arm 19ᵃ equipped with a roller 19ᵇ. And this roller is adapted to bear against a bar 22 which is normally arranged on the top of the casing in such an oblique position that in plan it converges rearwardly with respect to the shaft 18 on which the detent is fulcrumed and slidable. Therefore when the gear 12 is shifted rearwardly to place the transmission mechanism in reverse and the detent partakes of the movement this bar acts, through the roller and detent arm, to cam back the detent clear of the gear 12, so as not to obstruct the backward rotation of the gear in such a case. The bar 22 may be pivoted on a stud 23 at its rear end and it may have its forward end connected by a slot-and-pin connection with a transversely moving bar 24 slidable in the casing and having a hand-lever 25, suitably fulcrumed, connected with one end thereof, said hand lever projecting up through the floor 1 and having an operating knob 26. When lever 25 is shifted to bring bar 22 into the dotted line position in Fig. 3 the detent is obviously thrown out of action; the lever may be held in this position by the catch-plate 27 shown in Fig. 4. Bar 22 is supported against displacement under the pressure of the detent when the latter is automatically shifted out of action on placing the transmission in reverse by bar 24 which has a collar 24ª at that time engaging the casing 2.

Having thus fully described my invention what I claim and desire to secure by Letters Patent is:

1. In combination, with the fixed structure and a forwardly and backwardly rotative rotary part of the rotary system of an automobile, a detent movable into and out of chocking relation to said structure and said part and including a lever fulcrumed in said structure and a rotary member journaled in the lever both on axes parallel with that of said part, said structure including an arcuate surface peripherally engaged by said member and concentric with the axis of the lever.

2. The combination, with the rotary propeller member of an automobile, a gear splined and shiftable thereon, and a driving gear into driving engagement with which the splined gear is shiftable, of means to check rotation of the first gear when disengaged from the driving gear including a detent shiftable with the splined gear.

3. The combination, with the rotary propeller member of an automobile, a gear splined and shiftable thereon, and a driving gear into driving engagement with which the splined gear is shiftable, of means, including a detent shiftable with the splined gear, the check rotation of the splined gear when disengaged from the driving gear, said detent being also movable out of said relation to the splined gear, and means to move said detent out of said relation during shifting thereof with the splined gear.

4. The combination, with the rotary propeller member of an automobile, a gear splined and shiftable thereon, and a driving gear into driving engagement with which the splined gear is shiftable, of means, including a detent shiftable with the splined gear, to check rotation of the splined gear when disengaged from the driving gear, said detent being also movable out of said relation to the splined gear, and relatively fixed means to cam said detent out of said relation during shifting thereof with the splined gear.

5. The combination, with a rotary part of the rotary driven system of an automobile, of a detent to check rotation of said part movable into and out of engagement therewith, and means, including a pivoted device toward which the detent moves into engagement with said part and itself movable in the relatively opposite direction, for moving the detent out of such engagement.

6. The combination, with the rotary propeller member of an automobile, a gear splined and shiftable thereon, and a driving gear into driving engagement with which the splined gear is shiftable, of means, including a detent shiftable with the splined gear, to check rotation of the splined gear when disengaged from the driving gear, said detent being also movable out of said relation to the splined gear, and means to move said detent out of said relation including a camming device oblique to the path of shifting of the detent and also pivotally movable to move said detent out of said relation.

In testimony whereof I affix my signature.

MARTIN BRAEN.